United States Patent
Akkiraju et al.

(10) Patent No.: US 12,169,674 B2
(45) Date of Patent: Dec. 17, 2024

(54) TRAINING OF MACHINE LEARNING-BASED INVERSE LITHOGRAPHY TECHNOLOGY FOR MASK SYNTHESIS WITH SYNTHETIC PATTERN GENERATION

(71) Applicant: Siemens Industry Software Inc., Plano, TX (US)

(72) Inventors: Nataraj Akkiraju, Fremont, CA (US); Ilhami Torunoglu, San Jose, CA (US)

(73) Assignee: Siemens Industry Software Inc., Plano, TX (US)

( * ) Notice: Subject to any disclaimer, the term of this patent is extended or adjusted under 35 U.S.C. 154(b) by 764 days.

(21) Appl. No.: 17/461,652

(22) Filed: Aug. 30, 2021

(65) Prior Publication Data

US 2023/0064987 A1     Mar. 2, 2023

(51) Int. Cl.
*G06F 30/39*     (2020.01)
*G06F 30/27*     (2020.01)
*G06F 30/392*    (2020.01)
*G06N 20/00*     (2019.01)
*G06F 119/18*    (2020.01)

(52) U.S. Cl.
CPC .............. *G06F 30/39* (2020.01); *G06F 30/27* (2020.01); *G06F 30/392* (2020.01); *G06N 20/00* (2019.01); *G06F 2119/18* (2020.01)

(58) Field of Classification Search
CPC ........ G06F 30/39; G06F 30/392; G06F 30/27; G06F 2119/18; G06N 20/00
USPC ........... 716/53, 54, 55; 430/4, 5; 378/34, 35; 700/120, 121
See application file for complete search history.

(56) References Cited

U.S. PATENT DOCUMENTS 8,352,891 B2 *   1/2013   Reid ...................... G06F 30/39
                                                    700/121
11,023,644 B1 *  6/2021   Fenger ................ G03F 7/70516
(Continued)

FOREIGN PATENT DOCUMENTS

WO    WO-2020162979 A1 *   8/2020   ............... G03F 1/36

OTHER PUBLICATIONS

Kim et al., WO Patent Document No. WO-2021034321-A1, published Feb. 25, 2021, 4 pages including abstract and 1 drawing. (Year: 2021).*

(Continued)

*Primary Examiner* — Phallaka Kik

(57) ABSTRACT

This application discloses a computing system implementing a mask synthesis system to generate synthetic image clips of design shapes and corresponding mask data for the synthetic image clips. The mask data can describe lithographic masks capable of being used to fabricate the design shapes on an integrated circuit. The mask synthesis system can utilize the synthetic image clips of the design shapes and the corresponding mask data to train a machine-learning system to determine pixelated output masks from portions of the layout design. The mask synthesis system can identify one or more pixelated output masks for portions of a layout design describing an electronic system using the trained machine-learning. The mask synthesis system can synthesize a mask layout design for the electronic system based, at least in part, on the layout design describing the electronic system and the one or more pixelated output masks for the layout design.

20 Claims, 6 Drawing Sheets

(56) References Cited

U.S. PATENT DOCUMENTS

| | | | | |
|---|---|---|---|---|
| 11,194,951 | B1* | 12/2021 | Burbine | G03F 1/36 |
| 2012/0047473 | A1* | 2/2012 | Reid | G06F 30/39 |
| | | | | 716/53 |
| 2017/0205702 | A1* | 7/2017 | Word | G03F 1/36 |
| 2020/0072610 | A1* | 3/2020 | Hofmann | G01C 21/3852 |
| 2020/0174380 | A1* | 6/2020 | Huang | G06N 3/045 |
| 2020/0340813 | A1* | 10/2020 | Hofmann | G01C 21/005 |
| 2021/0064977 | A1* | 3/2021 | Cecil | G06F 30/27 |
| 2021/0249142 | A1* | 8/2021 | Lau | G16H 50/50 |
| 2021/0373443 | A1* | 12/2021 | Huang | G06F 16/2379 |
| 2022/0083807 | A1* | 3/2022 | Zhang | G06N 3/084 |
| 2022/0292249 | A1* | 9/2022 | Kim | G06F 30/398 |
| 2024/0061344 | A1* | 2/2024 | Huang | G06N 3/04 |

OTHER PUBLICATIONS

Yang et al., "Machine Learning for Mask Synthesis and Verification", https://yibolin.com/publications/papers/ML4CAD_Springer2018_Pan.pdf, 2018, pp. 1-44. (Year: 2018).*

Lin, "Deep Learning for Mask Synthesis and Verification: A Survey (Invited Paper)", 2021, Association for Computing Machinery, 8 pages. (Year: 2021).*

Thomas Cecil, et al. "Establishing Fast, Practical, Full-chip ILT Flows Using Machine Learning," 2020, pp. 1-19, Proc. SPIE 11327, San Jose, CA, United States.

H. Yang, S. Li, Y. Ma, B. Yu and E. F. Y. Young, "GAN-OPC: Mask Optimization with Lithography-guided Generative Adversarial Nets," 2018 55th ACM/ESDA/IEEE Design Automation Conference (DAC), San Francisco, CA, USA, Jun. 24, 2018, pp. 1-6.

* cited by examiner

TRAINING OF MACHINE LEARNING-BASED INVERSE LITHOGRAPHY TECHNOLOGY FOR MASK SYNTHESIS WITH SYNTHETIC PATTERN GENERATION

TECHNICAL FIELD

This application is generally related to electronic design automation and, more specifically, to training of machine learning-based inverse lithography technology for mask synthesis with synthetic pattern generation.

BACKGROUND

In a design flow for fabricating integrated circuits, a physical design of an integrated circuit can describe specific geometric elements, often referred to as a layout design. The geometric elements, which typically are polygons, define the shapes that will be created in various materials to manufacture the integrated circuit. Typically, a designer will select groups of geometric elements representing circuit device components, e.g., contacts, gates, etc., and place them in a design area. These groups of geometric elements may be custom designed, selected from a library of previously-created designs, or some combination of both. Once the groups of geometric elements representing circuit device components have been placed, geometric elements representing connection lines then are then placed between these geometric elements according to the predetermined route. These lines will form the wiring used to interconnect the electronic devices.

Descriptions for physical designs of integrated circuits can be provided in many different formats. The Graphic Data System II (GDSII) format is a popular format for transferring and archiving two-dimensional (2D) graphical circuit layout data. Among other features, it contains a hierarchy of structures, each structure including layout elements (e.g., polygons, paths or poly-lines, circles and text-boxes). Other formats include an open source format named Open Access, Milkyway, EDDM, and Open Artwork System Interchange Standard (OASIS). These various industry formats are used to define the geometrical information in layout designs that are employed to manufacture integrated circuits. Once the design is finalized, the layout portion of the design can be used by fabrication tools to manufacture the circuit using a photolithographic process.

There are many different fabrication processes for manufacturing a circuit, but most processes include a series of steps that deposit layers of different materials on a substrate, expose specific portions of each layer to radiation, and then etch the exposed (or non-exposed) portions of the layer away. For example, a simple semiconductor device component could be manufactured by the following steps. First, a positive type epitaxial layer is grown on a silicon substrate through chemical vapor deposition. Next, a nitride layer is deposited over the epitaxial layer. Then specific areas of the nitride layer are exposed to radiation, and the exposed areas are etched away, leaving behind exposed areas on the epitaxial layer, (i.e., areas no longer covered by the nitride layer). The exposed areas then are subjected to a diffusion or ion implantation process, causing dopants, for example phosphorus, to enter the exposed epitaxial layer and form charged wells. This process of depositing layers of material on the substrate or subsequent material layers, and then exposing specific patterns to radiation, etching, and dopants or other diffusion materials, is repeated a number of times, allowing the different physical layers of the circuit to be manufactured.

Each time that a layer of material is exposed to radiation, a mask is created to expose only the desired areas to the radiation, and to protect the other areas from exposure. The mask is created from circuit layout data. That is, the geometric elements described in a layout design define the relative locations or areas of the circuit that will be exposed to radiation through the mask. A mask or reticle writing tool is used to create the mask based upon the layout design, after which the mask can be used in a photolithographic process.

As designers and manufacturers continue to increase the number of circuit components in a given area and/or shrink the size of circuit components, the shapes reproduced on the substrate (and thus the shapes in the mask) become smaller and are placed closer together. This reduction in feature size increases the difficulty of faithfully reproducing the image intended by the layout design onto the substrate. The diffractive effects of light often result in defects where the intended image is not accurately printed onto the substrate during the photolithographic process, creating flaws in the manufactured device. One or more resolution enhancement techniques (RETs) are often employed to improve the resolution of the image that the mask forms on the substrate during the photolithographic process.

One of these techniques—optical proximity correction (OPC)—adjusts the amplitude of the light transmitted through a lithographic mask by modifying the mask layout design data employed to create the mask. For example, edges in the mask layout design may be adjusted to make certain portions of the geometric elements larger or smaller in accordance with how much additional light exposure (or lack of exposure) is desired at certain points on the substrate. When these adjustments are appropriately calibrated, overall pattern fidelity can be increased.

A specific form of optical proximity correction, called inverse lithography technology (ILT), can iteratively utilize simulation and mathematical computation to generate mask layout design data with assist features describing at least one lithographic mask from the layout design. While the accuracy of the ILT optical proximity correction can exceed other forms of optical proximity correction, such as rules-based or model-based optical proximity correction, that accuracy comes with a trade-off of the process being time-consuming and computationally-expensive, which limits its industrial applicability, for example, to analyzing hotspots in a layout design or for process characterization.

SUMMARY

This application discloses a computing system implementing a mask synthesis system to generate synthetic image clips of design shapes and corresponding mask data for the synthetic image clips. The mask data can describe lithographic masks capable of being used to fabricate the design shapes on an integrated circuit. The mask synthesis system can generate the synthetic image clips of design shapes by determining design rules from a technology file describing a process for fabricating the electronic system on the integrated circuit, and utilizing characteristics of the design shapes in the technology file to determine different possible configurations of the design shapes, and generating the synthetic image clips of the design shapes based on the different possible configurations of the design shapes. The mask synthesis system can utilize the synthetic image clips of the design shapes and the corresponding mask data to train a machine-learning system to determine pixelated output masks from portions of the layout design.

The mask synthesis system can divide a layout design describing an electronic system into multiple image cells and then utilize the trained machine-learning system to identify one or more pixelated output masks for image cells of the layout design. The mask synthesis system can utilize an inverse lithography technology optical proximity correction system to synthesize the pixelated output masks for image cells into mask data, which the mask synthesis system can aggregate into a mask layout design for the electronic system. Embodiments of will be described below in greater detail.

DETAILED DESCRIPTION

Illustrative Operating Environment

Figure 1:
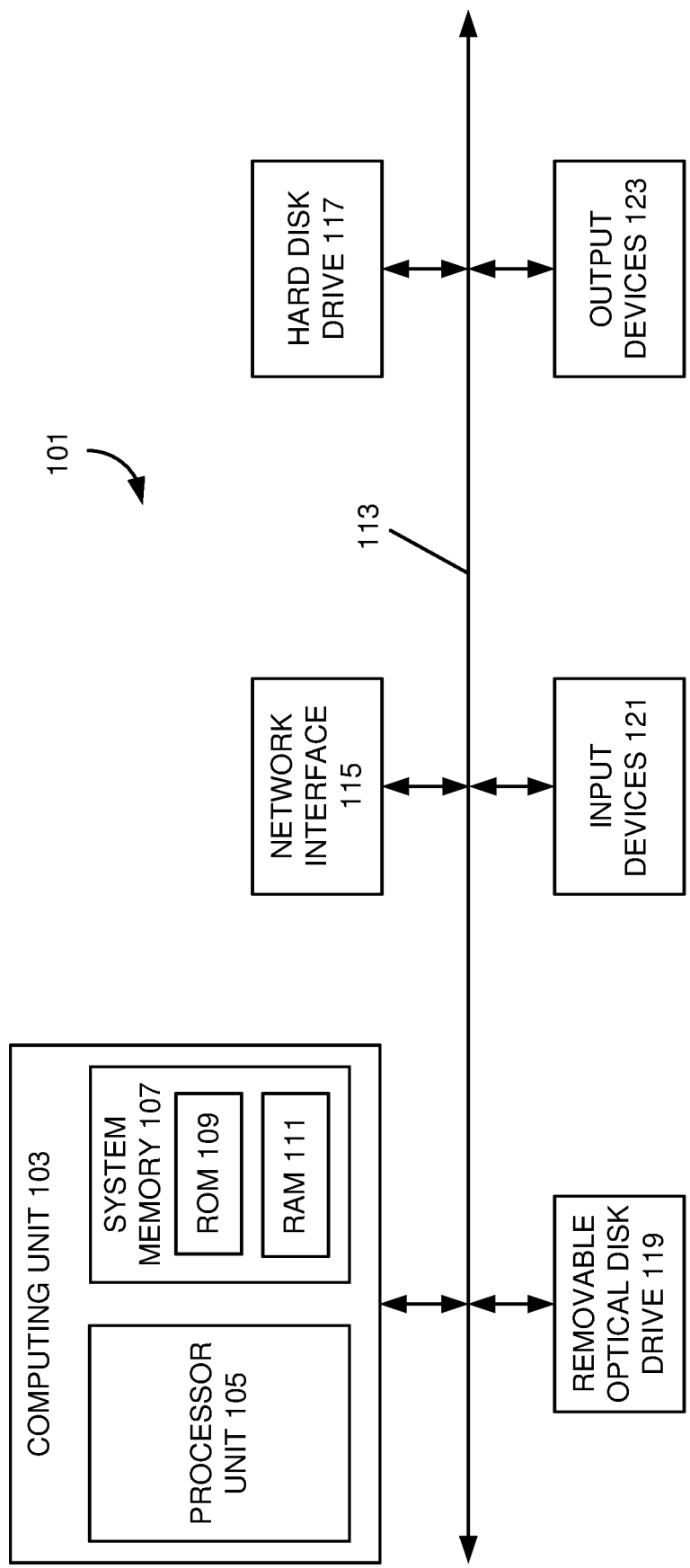
FIGS. 1 and 2 illustrate an example of a computer system of the type that may be used to implement various embodiments.

Various examples may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 115-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 115-123 may be internally housed with the computing unit 103. Alternately, one or more of the peripheral devices 115-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
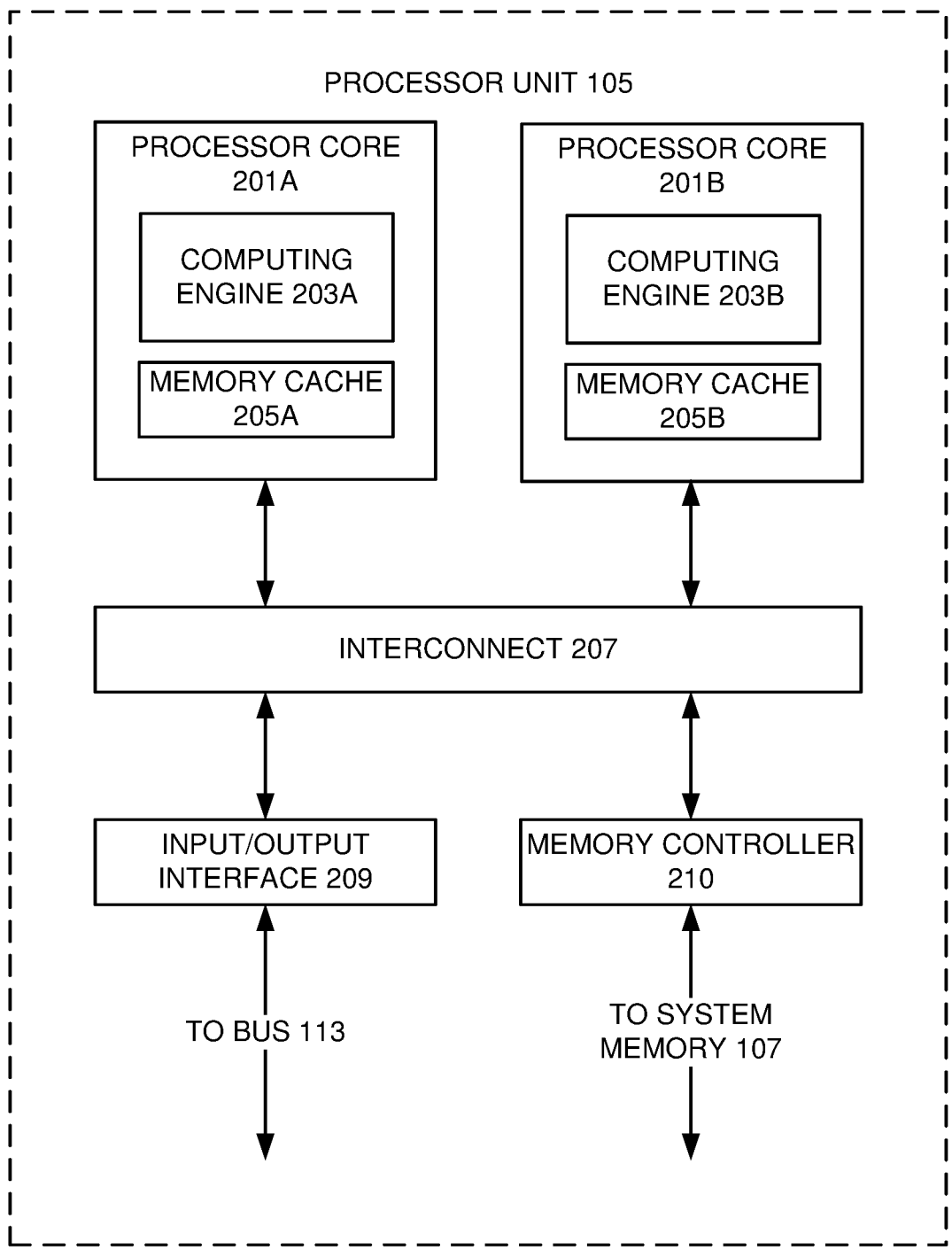

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, California, the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments.

Figure 3:
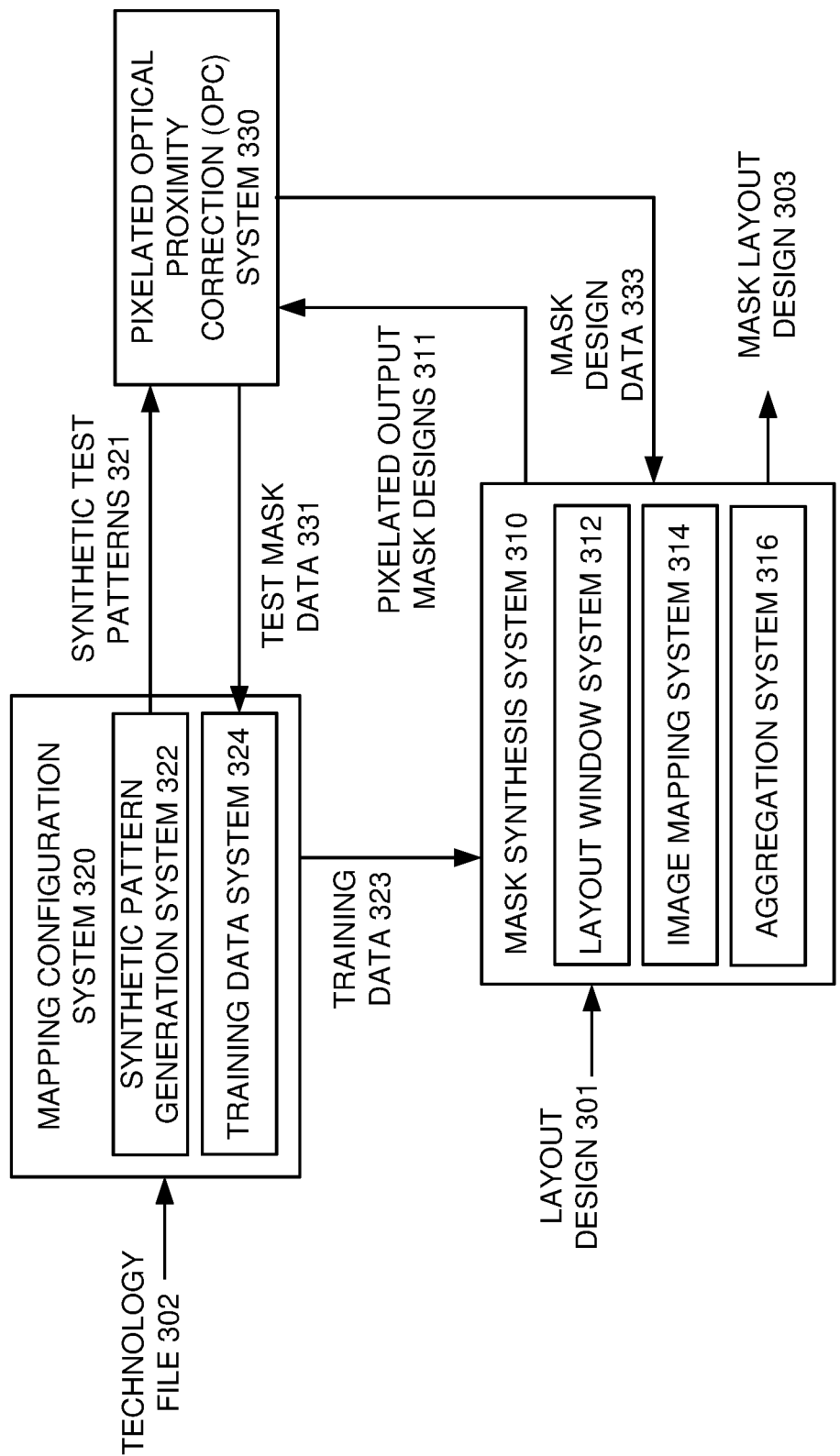
FIG. 3 illustrates an example of a mask synthesis system with synthetic pattern training of machine learning-based mask prediction for inverse lithography technology according to various embodiments.

Inverse Lithography Technology Optical Proximity Correction with Machine Learning-Based Image Mapping FIG. 3 illustrates an example of a mask synthesis system 310 with synthetic pattern training of machine learning-based mask prediction for inverse lithography technology (ILT) optical proximity correction (OPC) according to various embodiments. Referring to FIG. 3, the mask synthesis system 310 can receive a layout design 301 of an electronic system. The layout design 301 can define geometrical information capable of being utilized to manufacture an integrated circuit, such as the electronic system, which can be specified in a Graphic Data System II (GDSII) format, an Open Access format, a Milkyway format, an EDDM format, an Open Artwork System Interchange Standard (OASIS) format, or the like.

The mask synthesis system 310 can work with a pixelated optical proximity correction (OPC) system 330 to generate a mask layout design 303 for the layout design 301. The mask layout design 303 can describe one or more lithographic masks capable of being used to fabricate the electronic system described by the layout design 301. The mask synthesis system 310 can utilize machine-learning image mapping to generate pixelated mask designs for different portions of the layout design 301. The pixelated OPC system 330 can perform inverse lithography technology (ILT) optical proximity correction on the pixelated mask designs to eliminate or reduce residual noise or error, for example, iteratively determining printed images on a substrate resulting from the light exposure through one or more lithographic masks described by the pixelated mask designs and then modifying the pixelated mask designs to increase overall pattern fidelity. The mask synthesis system 310 can generate the mask layout design 303 based on the modified pixelated mask designs. By utilizing machine-learning image mapping to generate the pixelated mask designs, rather than allow the pixelated OPC system 330 to perform all of the mask synthesis, the mask synthesis system 310 can reduce a number of iterations of the pixelated OPC system 330 and generate the mask layout design 303 in a reduced amount of time. Embodiments of machine learning-based inverse lithography technology mask synthesis will be described below in greater detail with reference to FIG. 4.

Figure 4:
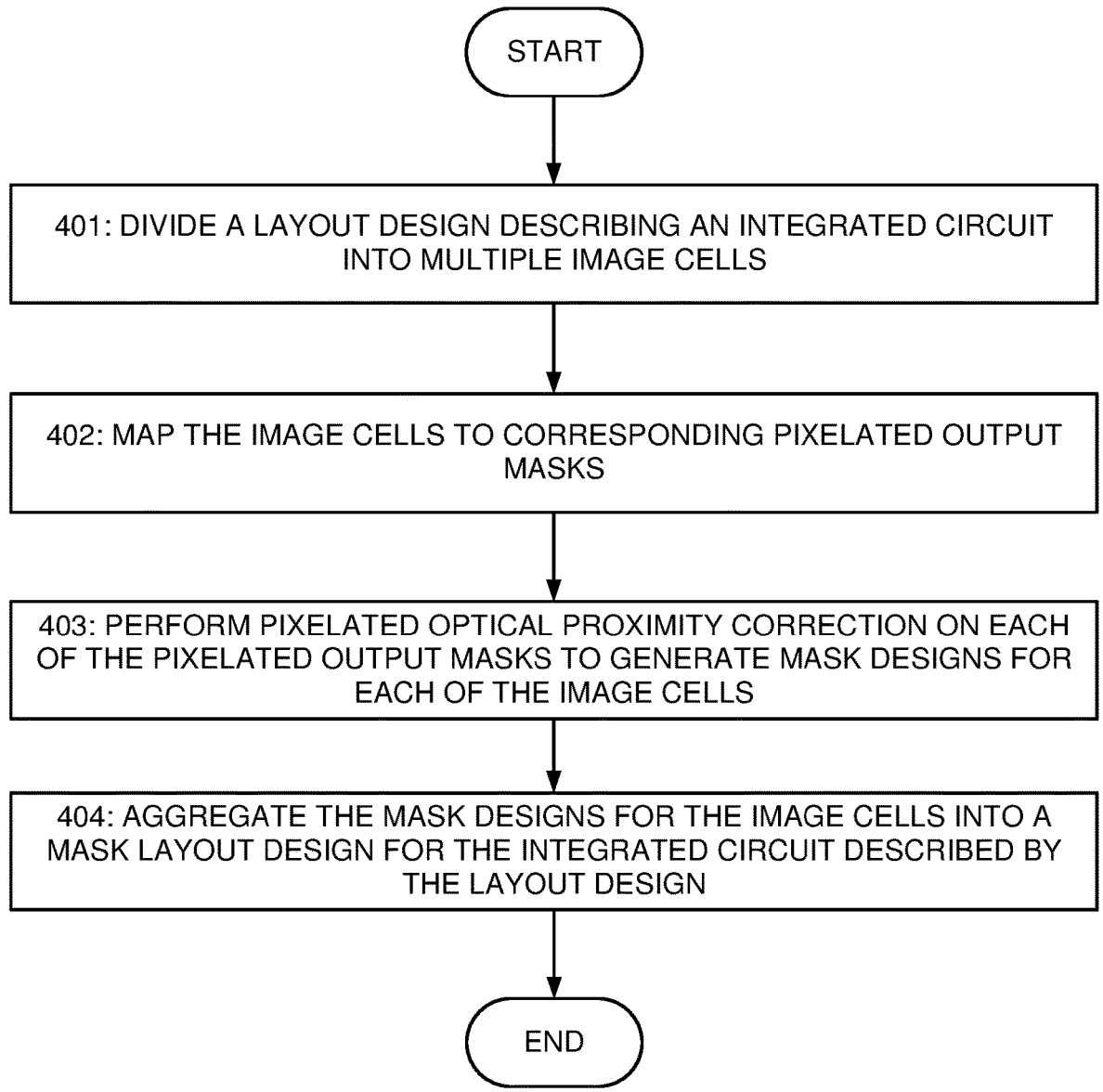
FIG. 4 illustrates a flowchart showing example machine learning-based inverse lithography technology mask synthesis according to various examples.

FIG. 4 illustrates a flowchart showing example machine learning-based inverse lithography technology mask synthesis according to various examples. Referring to FIGS. 3 and 4, the mask synthesis system 310 can include a layout window system 312 that, in a block 401 of FIG. 4, can divide the layout design 301 describing an integrated circuit into multiple cells, which can be rasterized into image clips or image cells. Each image cell can correspond to a portion of the layout design 301. In some embodiments, the layout design 301 can be partitioned into tiles and the tiles can be divided into the cells. Embodiments of the division of the layout design 301 into cells will be described below in greater detail with reference to FIGS. 5A and 5B.

Figure 5A:
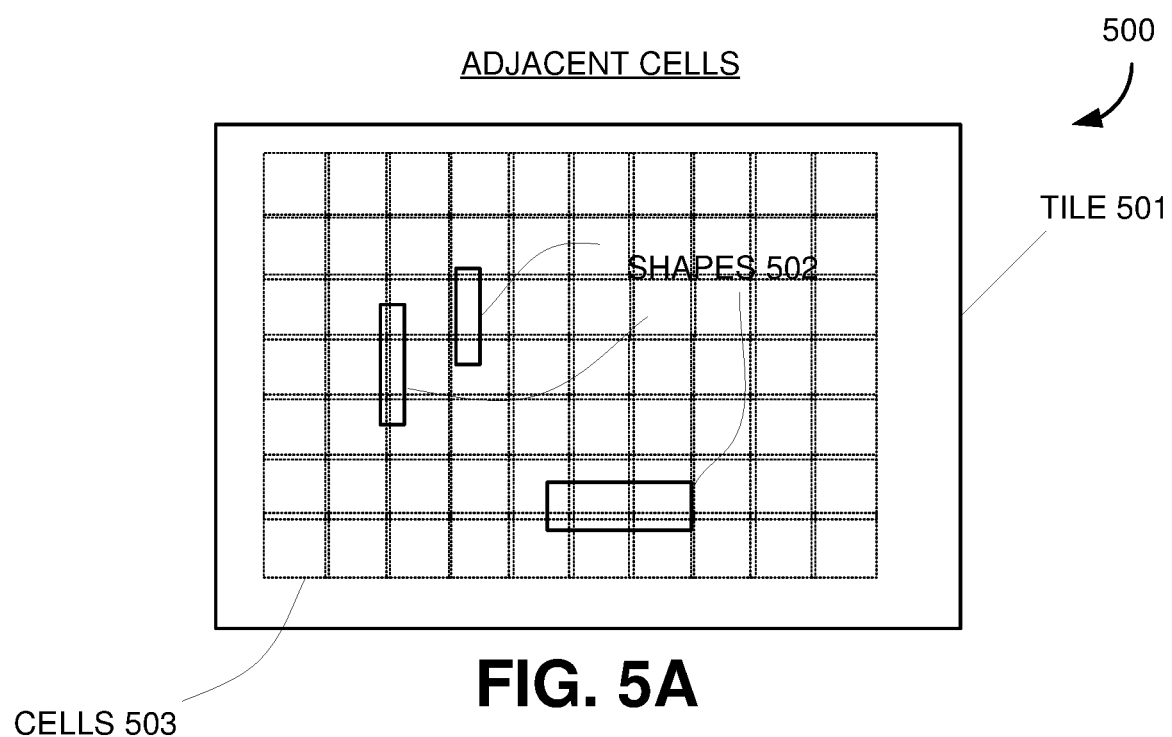
FIGS. 5A and 5B illustrate example techniques to divide a layout design for machine learning-based inverse lithography technology mask synthesis according to various embodiments.
Figure 5B:
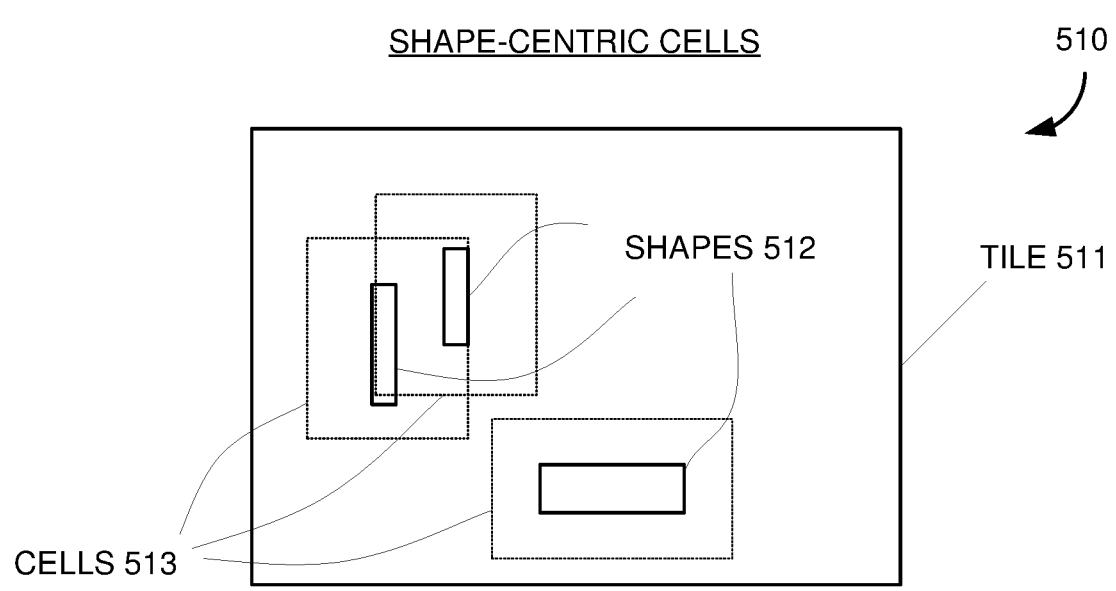

FIGS. 5A and 5B illustrate example techniques to divide a layout design for machine learning-based inverse lithography technology mask synthesis according to various embodiments. Referring to FIG. 5A, a portion of a layout design 500 corresponding to a tile 501 is shown. The tile 501 can include multiple shapes 502 corresponding to structures in the layout design 500 to be fabricated onto an integrated circuit. During mask synthesis operations, at least a portion of the tile 501 can be divided into multiple cells 503, which can have a halo that can slightly overlap at least one neighboring or adjacent cell, and then rasterized into image clips corresponding to the cells 503.

Referring to FIG. 5B, a portion of a layout design 510 corresponding to a tile 511 is shown. The tile 511 can include multiple shapes 512 corresponding to structures in the layout design 510 to be fabricated onto an integrated circuit. During mask synthesis operations, at least a portion of the tile 511 can be divided into multiple cells 513, which can include one or more of the shapes 512, and then rasterized into image clips corresponding to the cells 513. Since the location of the cells 513 can be based on the location of the shapes 512 in the tile 511, a plurality of the cells 513 can at least partially overlap each other.

Referring back to FIGS. 3 and 4, the mask synthesis system 310 can include an image mapping system 314 that, in a block 402 of FIG. 4, can map the image cells to corresponding pixelated output mask designs 311. As discussed above, the image mapping system 314 can include a machine-learning algorithm trained to identify a non-linear mapping between image cells and pixelated mask designs. The machine-learning algorithm can utilize the non-linear mapping to determine the pixelated output mask designs 311 based on the image cells of the layout design 301.

The mask synthesis system 310 can receive training data 323 from a mapping configuration system 320. The training data 323 can correspond to combined sets of synthetic image clips and mask data, which the mask synthesis system 310, in some embodiments, can utilize to train the machine-learning algorithm in the image mapping system 314. Embodiments of generating the training data 323 for the machine-learning algorithm will be described below in greater detail with reference to FIG. 6.

The pixelated OPC system 330, in a block 403 of FIG. 4, can perform pixelated optical proximity correction on each of the pixelated output mask designs 311 to generate mask design data 333 for each of the image cells. The mask synthesis system 310 can provide the pixelated output mask designs 311 to the pixelated OPC system 330, which can utilize the pixelated output mask designs 311 to generate corresponding mask design data 333. The pixelated OPC system 330 can perform inverse lithography technology (ILT) optical proximity correction on the pixelated output mask designs 311 to eliminate or reduce residual error, which can determine printed images on a substrate resulting from the light exposure through one or more lithographic masks described by the pixelated output mask designs 311 and then modify the pixelated output mask designs 311 to increase overall pattern fidelity. In some embodiments, the pixelated OPC system 330 can iteratively modify the pixelated output mask designs 311, for example, based on simulation and mathematical computation, to generate the mask design data 333 with the assist features.

The mask synthesis system 310 can include an aggregation system 316 that, in a block 404 of FIG. 4, can aggregate the mask design data 333 for the image cells into the mask layout design 303 for the integrated circuit described by the layout design 301. In some embodiments, the aggregation system 316 can correlate the mask design data 333 received from the pixelated OPC system 330 to the image cells associated with the layout design 301 and then stitch the mask design data 333 together based on the correlation. For example, when the image cells overlap with each other, the aggregation system 316 merge at least a portion of the mask design data 333 together to generate a combined mask design data, which can be stitched with other mask design data 333 to generate the mask layout design 303.

Figure 6:
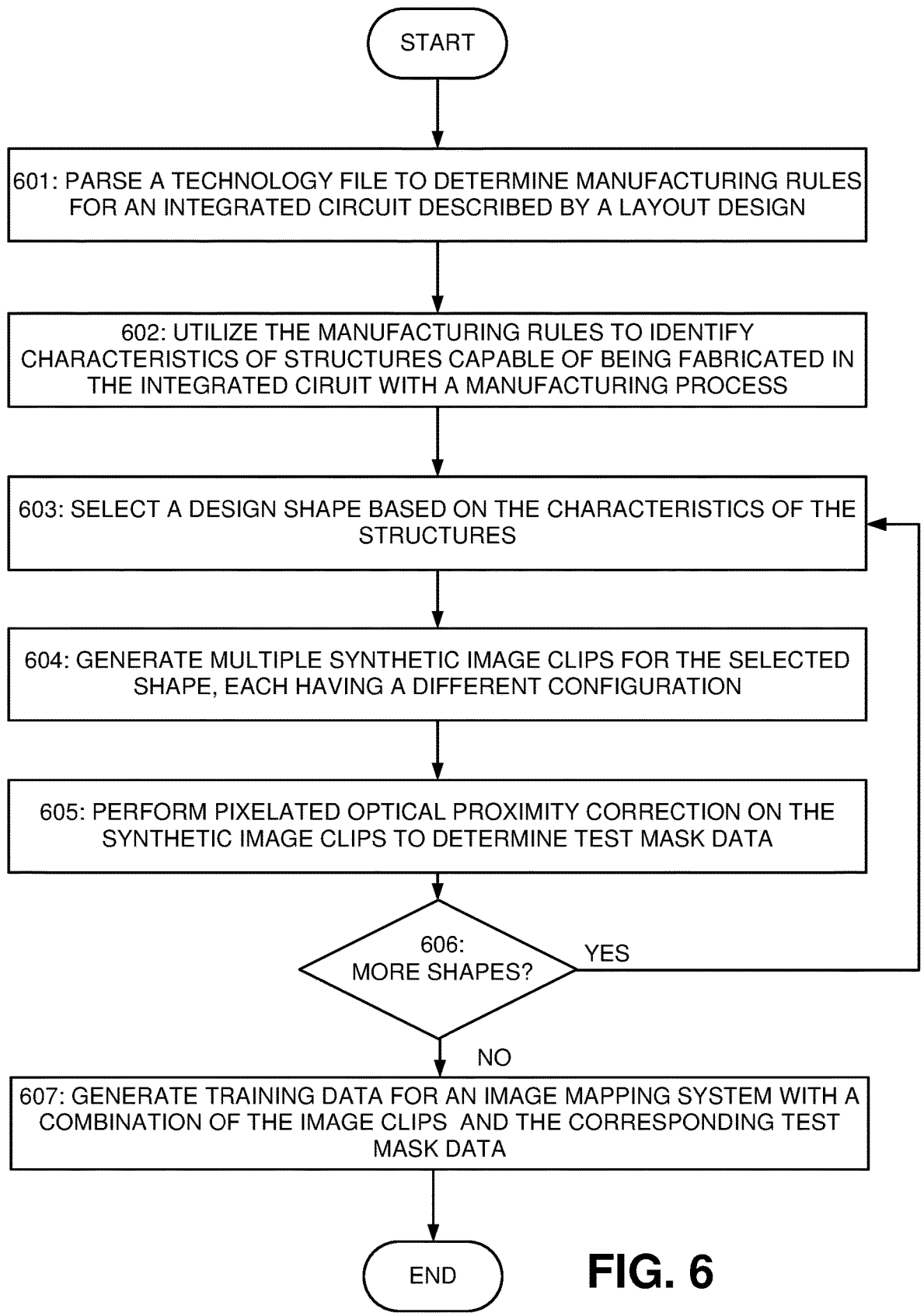
FIG. 6 illustrates a flowchart showing example synthetic pattern generation for use in training a machine learning algorithm used in inverse lithography technology mask synthesis according to various examples.

FIG. 6 illustrates a flowchart showing example synthetic pattern generation for use in training a machine learning algorithm used in inverse lithography technology mask synthesis according to various examples. Referring to FIGS. 3 and 6, the mapping configuration system 320 can receive a technology file 302 that includes manufacturing rules corresponding to physical properties of an integrated circuit for a manufacturing process. The manufacturing rules can define a size of shapes or structures, spacing between shapes or structures, height of layers, materials used in layers, a dielectric values for the layers, or the like, capable of being fabricated using a specific manufacturing process. The mapping configuration system 320 can include a synthetic pattern generation system 322 that, in a block 601 of FIG. 6, can parse the technology file 302 to determine the manufacturing rules for the manufacturing process.

The synthetic pattern generation system 322, in a block 602 of FIG. 6, can utilize the manufacturing rules to identify characteristics of structures capable of being fabricated in the integrated circuit with a manufacturing process. In some embodiments, the synthetic pattern generation system 322 can use the characteristics of the structures to identify the configurations of shapes capable of being fabricated by the manufacturing process, such as sizes of shapes or structures that can be fabricated, spacing between shapes or structures, or the like.

The synthetic pattern generation system 322, in a block 603 of FIG. 6, can select a design shape based on the characteristics of the structures from the technology file 302. In some embodiments, the synthetic pattern generation system 322 can select a design shape by setting a size and an orientation of the design shape capable of being fabricated according to the manufacturing rules in the technology file 302. The synthetic pattern generation system 322, in a block 604 of FIG. 6, can generate multiple synthetic image clips for the selected shape, each having a different configuration. For example, the synthetic pattern generation system 322 can utilize the selected shape to generate a set of synthetic image clips that include the selected shape alone or along with other structures located adjacent to the selected shape with a spacing defined by the manufacturing rules in the technology file 302. The set of the synthetic image clips can be provided to the pixelated OPC system 330 as synthetic test patterns 321.

The pixelated OPC system 330, in a block 605 of FIG. 6, can perform pixelated optical proximity correction on the synthetic test patterns 321, which can generate test mask data 331. The test mask data 331 can describe a lithographic mask capable of being used to manufacture the shapes or structures present in the synthetic image clips. The mapping configuration system 320 can include a training data system 324 to correlate each synthetic image clip or synthetic test pattern 321 to their corresponding test mask data 331. The correlated pairs of synthetic test patterns 321 and test mask data 331 can be utilized as a portion of the training data 323 generated by the mapping configuration system 320.

The synthetic pattern generation system 322, in a block 606, can determine whether there are more shapes to select based on the manufacturing rules from the technology file 302. When, in the block 606, the synthetic pattern generation system 322 determines to select at least one additional shape, execution can return to the block 603, where the computing system implementing the synthetic pattern generator can select another one of the design shapes.

When, in the block 606, the synthetic pattern generation system 322 determines not to select an additional shape, execution can proceed to a block 607, where the training data system 324 can generate the training data 323 for the image mapping system 314. The training data system 324 can accumulate the correlated pairs of the synthetic test patterns 321 and corresponding test mask data 331 into a dataset, which the training data system 324 can output to the mask synthesis system 310 as the training data 323. By synthetically generating test patterns or image clips with various configurations based on the technology file 302, the mapping configuration system 320 can reduce a size of the training data 323 used to train the machine-learning algorithm in the image mapping system 314, which can speed-up the overall configuration time. Also, by reducing the size of the image cells to focus on individual shapes, the size of the training data 323 also can be reduced, while allowing a trained machine-learning algorithm the ability to accurately predict the pixelated output mask designs 311 that reduces the number of iterations utilized by the pixelated OPC system 330.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Conclusion

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   utilizing, by a computing system, synthetic image clips of design shapes to determine corresponding mask data for the synthetic image clips, wherein the mask data describes lithographic masks capable of being used to fabricate the design shapes on an integrated circuit;
   identifying, by the computing system, one or more pixelated output masks for portions of a layout design describing an electronic system using a machine-learning system trained using the synthetic image clips of the design shapes and the corresponding mask data; and
   synthesizing, by the computing system, a mask layout design for the electronic system based, at least in part, on the layout design describing the electronic system and the one or more pixelated output masks for the layout design.

2. The method of claim 1, further comprising:
   determining, by the computing system, manufacturing rules from a technology file describing a process for fabricating the electronic system on the integrated circuit; and
   utilizing, by the computing system, characteristics of the design shapes in the technology file to determine different possible configurations of the design shapes; and
   generating, by the computing system, the synthetic image clips of the design shapes based on the different possible configurations of the design shapes.

3. The method of claim 1, further comprising utilizing, by the computing system, the synthetic image clips of the design shapes and the corresponding mask data to train machine-learning system to determine pixelated output masks from portions of the layout design.

4. The method of claim 1, further comprising dividing, by a computing system, the layout design into multiple image cells, each image cell corresponding to one of the portions of the layout design, wherein synthesizing the mask layout design for the electronic system includes generating mask data for each of the image cells, and aggregating the mask data into the mask layout design for the electronic system.

5. The method of claim 4, wherein a plurality of the image cells at least partially overlap.

6. The method of claim 1, wherein synthesizing the mask layout design for the electronic system further comprises performing inverse lithography technology optical proximity correction, which modifies features in the one or more pixelated output masks to generate a final mask layout design.

7. The method of claim 1, wherein the machine-learning system trained using the synthetic image clips of the design shapes and the corresponding mask data is configured to map the portions of the layout design to the one or more pixelated output masks.

8. A system comprising:
   a memory system configured to store computer-executable instructions; and
   a computing system, in response to execution of the computer-executable instructions, is configured to:
      utilize synthetic image clips of design shapes to determine corresponding mask data for the synthetic image clips, wherein the mask data describes lithographic masks capable of being used to fabricate the design shapes on an integrated circuit;
      identify one or more pixelated output masks for portions of a layout design describing an electronic system using a machine-learning system trained using the synthetic image clips of the design shapes and the corresponding mask data; and
      synthesize a mask layout design for the electronic system based, at least in part, on the layout design describing the electronic system and the one or more pixelated output masks for the layout design.

9. The system of claim 8, wherein the computing system, in response to execution of the computer-executable instructions, is further configured to:
   determine manufacturing rules from a technology file describing a process for fabricating the electronic system on the integrated circuit; and utilize characteristics of the design shapes in the technology file to determine different possible configurations of the design shapes; and
generate the synthetic image clips of the design shapes based on the different possible configurations of the design shapes.

10. The system of claim 8, wherein the computing system, in response to execution of the computer-executable instructions, is further configured to utilize the synthetic image clips of the design shapes and the corresponding mask data to train machine-learning system to determine pixelated output masks from portions of the layout design.

11. The system of claim 8, wherein the computing system, in response to execution of the computer-executable instructions, is further configured to:
divide the layout design into multiple image cells, each image cell corresponding to one of the portions of the layout design;
generate mask data for each of the image cells; and
aggregate the mask data to synthesize the mask layout design for the electronic system.

12. The system of claim 8, wherein the computing system, in response to execution of the computer-executable instructions, is further configured to refine the mask layout design for the electronic system by performing inverse lithography technology optical proximity correction, which modifies features in the one or more pixelated output masks to generate a final mask layout design.

13. The system of claim 8, wherein the machine-learning system trained using the synthetic image clips of the design shapes and the corresponding mask data is configured to map the portions of the layout design to the one or more pixelated output masks.

14. An apparatus comprising at least one computer-readable memory device storing instructions configured to cause one or more processing devices to perform operations comprising:
utilizing synthetic image clips of design shapes to determine corresponding mask data for the synthetic image clips, wherein the mask data describes lithographic masks capable of being used to fabricate the design shapes on an integrated circuit;
identifying one or more pixelated output masks for portions of a layout design describing an electronic system using a machine-learning system trained using the synthetic image clips of the design shapes and the corresponding mask data; and
synthesizing a mask layout design for the electronic system based, at least in part, on the layout design describing the electronic system and the one or more pixelated output masks for the layout design.

15. The apparatus of claim 14, wherein the instructions are configured to cause one or more processing devices to perform operations further comprising:
determining manufacturing rules from a technology file describing a process for fabricating the electronic system on the integrated circuit; and
utilizing characteristics of the design shapes in the technology file to determine different possible configurations of the design shapes; and
generating the synthetic image clips of the design shapes based on the different possible configurations of the design shapes.

16. The apparatus of claim 14, wherein the instructions are configured to cause one or more processing devices to perform operations further comprising utilizing the synthetic image clips of the design shapes and the corresponding mask data to train machine-learning system to determine pixelated output masks from portions of the layout design.

17. The apparatus of claim 14, wherein the instructions are configured to cause one or more processing devices to perform operations further comprising dividing the layout design into multiple image cells, each image cell corresponding to one of the portions of the layout design, wherein synthesizing the mask layout design for the electronic system includes generating mask data for each of the image cells, and aggregating the mask data into the mask layout design for the electronic system.

18. The apparatus of claim 17, wherein a plurality of the image cells at least partially overlap.

19. The apparatus of claim 14, wherein synthesizing the mask layout design for the electronic system further comprises performing inverse lithography technology optical proximity correction, which modifies features in the one or more pixelated output masks to generate the mask layout design.

20. The apparatus of claim 14, wherein the machine-learning system trained using the synthetic image clips of the design shapes and the corresponding mask data is configured to map the portions of the layout design to the one or more pixelated output masks.

* * * * *